(12) United States Patent
Cooke

(10) Patent No.: US 7,818,538 B2
(45) Date of Patent: Oct. 19, 2010

(54) HASHING AND SERIAL DECODING TECHNIQUES

(76) Inventor: Laurence H. Cooke, 626 Towsend Dr., Aptos, CA (US) 95003

(*) Notice: Subject to any disclaimer, the term of this patent is extended or adjusted under 35 U.S.C. 154(b) by 63 days.

(21) Appl. No.: 12/199,024

(22) Filed: Aug. 27, 2008

(65) Prior Publication Data

US 2008/0320271 A1    Dec. 25, 2008

Related U.S. Application Data

(62) Division of application No. 11/208,882, filed on Aug. 23, 2005, now Pat. No. 7,421,563.

(51) Int. Cl.
*G06F 12/00* (2006.01)
(52) U.S. Cl. .................. 711/219; 711/216; 711/217; 711/218
(58) Field of Classification Search .......... 711/216–219
See application file for complete search history.

(56) References Cited

U.S. PATENT DOCUMENTS

| | | | |
|---|---|---|---|
| 4,667,313 A | 5/1987 | Pinkham et al. | |
| 5,452,255 A | 9/1995 | Mine et al. | |
| 6,530,051 B1 * | 3/2003 | Weinfurtner | 714/731 |
| 6,639,867 B2 | 10/2003 | Shim | |
| 6,785,278 B1 | 8/2004 | Calvignac et al. | |
| 6,804,768 B2 | 10/2004 | Moyer | |
| 6,907,439 B1 | 6/2005 | Wicker | |

* cited by examiner

*Primary Examiner*—Jasmine Song
(74) *Attorney, Agent, or Firm*—Connolly Bove Lodge & Hutz LLP

(57) ABSTRACT

A serial decoding technique may employ one or more circular shift register strings in which an input to an element of a shift register string may be gated by either an address input or the inverse of the address input. An output word line of the decoder may be driven by a respective shift register stage in the case of a single shift register string, or by a logical combination of shift register stages from respective shift register strings in the case of multiple shift register strings.

17 Claims, 10 Drawing Sheets

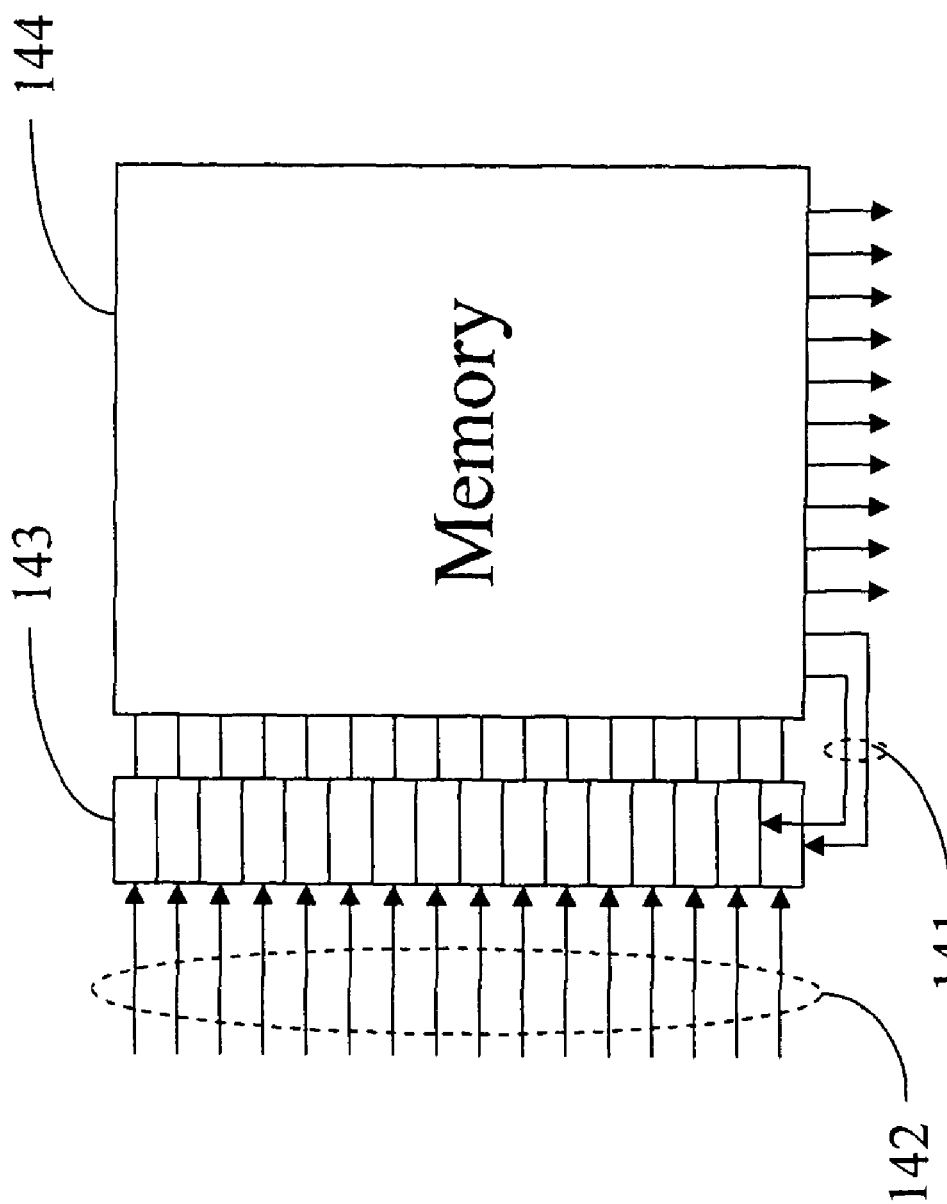

HASHING AND SERIAL DECODING TECHNIQUES

CROSS-REFERENCE TO RELATED APPLICATION

The present application is a divisional of U.S. patent application Ser. No. 11/208,882, filed Aug. 23, 2005, which is hereby incorporated by reference.

FIELD OF THE INVENTION

The present invention pertains to decoding a serial stream of address data and traversing all entries of a Hash Table in a non-incremental fashion. Both the structure of the serial decoder and the data used to generate the non-incremental Hash Table addresses are derived from the results of an algorithm, which generates a list of 2N numbers in non-numerical order.

BACKGROUND OF THE INVENTION

Numerous examples of serial memory addressing exist including U.S. Pat. No. 4,667,313, granted May 19, 1984 to Pinkham et. al.; U.S. Pat. No. 5,452,255, granted Sep. 9, 1995 to Mine et al.; and U.S. Pat. No. 6,639,867, granted Oct. 28, 2003, but they all serially load a register with the address, and then use various combinations of the shift register data and traditional decode logic to select the specific word, as opposed to directly serially decoding the address.

Serial loading of addresses, as well as serial access of successive memory locations is becoming more important as the asynchronous high bandwidth nature of communications between chips and the cost of integrated circuit I/O coupled with the inherently slower on-chip clocking is resulting in a shift away from parallel synchronous input to high-speed Serialize/De-serialize (SERDES) input. Currently the external serial input is shifted into a register, which is driven in parallel into the chip when the last bit is captured. If the data is an address, it is decoded in parallel in order to access the memory. As a result there is the delay of the parallel decode and word access after the last external bit is available when accessing an on chip memory.

Alternatively, in high-speed systems, the address is broken into high- and low-order bits. Presumably the high-order bits are loaded first, and then the low-order bits are loaded. These low-order bits are powered up and drive successive levels of multiplexers to make the data available on the output shortly after the low-order bits are loaded into their register.

Reference is now made to FIG. 1. Many communications chips have high-speed serial interfaces, and some of the data being serially sent to such chips consists of address data. Typically this data is first converted from serial to parallel form in a SERDES 10. The address data is then transferred to the address registers 13,14 of an on-chip memory. In high performance memory designs, the high-order bits of the address data are loaded into a register 13 and decoded through a decoder 12, to drive one of the word lines in the memory core 11. The resulting data from that word line is then selected by loading the lower-order bits of the address data into a separate address register 14, which drives a series of multiplexers 15. By loading the high-order bits first, the data can be available on the inputs of the multiplexers 15 when the low-order address bits are loaded in their address register 14, limiting the access time to the delay from the address register 14 through the multiplexers 15. In simpler memories, both high- and low-order bits are loaded at the same time. In that case, the access time is the propagation time through the decode 12, memory core 11 and multiplexers 15. The translation from serial to parallel operation is required because this propagation time is typically much longer than a single serial clock cycle.

Using serial address data to access memories is a typical operation in high-speed serial communications routers and switches, which must be able to translate a large number of addresses into a limited number of port addresses or to indicate the address is not translated to a port in this network. Content-Addressable Memories (CAMs) have occasionally been used to do this type of operation. CAMs have the advantage of completing the search in one operation, but they require both a lot of time per access and a lot of transistors per memory element because they compare the inputs with all the words in their memories on each operation. An alternative is the hardware equivalent of a software technique called hashing.

Hashing searches a limited number of items that are stored in a small linear array when the address space for those items is much larger than the array itself by accessing the array with an index address that is both within the range of the array and is an arithmetic function of the item's full address. This implies that many items with different full addresses could map to the same index address. The problem then becomes storing the items efficiently enough in the array to maximize the utilization of the array while finding any given entry in the fewest number of memory accesses. Existing software hashing techniques suggest hashing tables contain a prime number of locations and the index for addressing into the hashing tables maps the large address space evenly into each of the locations. Since there could be multiple items in the table with the same index, only one of which is stored at the index address, it is also necessary to step through the memory in some fashion if the first item accessed is not the correct one. Many hashing algorithms suggest incrementing through the hashing table with another prime that is smaller than the size of the table. Ring theory shows that this will ultimately traverse through all elements in the table without repetition. One way to create an initial index and increment may be:

```
Index = Mod(original address, table size), and
Increment = some prime < table size
```

Now to determine the existence of an item in the table, perform the following:

```
Do until item = Table(Index) or Table(Index) = null
    Index = Index + Increment
Loop
```

If the Table(Index) is null, then the item doesn't exist in the table; otherwise it does. In many applications, if it doesn't exist, it is added to the table. Clearly, the table begins with all null values and becomes more inefficient in determining if an item is in the table as the number of entries grows, since clashes exist with multiple items that map to the same hashing index.

Traditionally the Increment is a constant 1, which makes the next index easy to create, but often the data put into a hash table clusters about a few numbers, which makes the simple increment inefficient. Two solutions have been proposed in the past to eliminate this problem: either create an index that sufficiently separates otherwise adjacent entries, or create an increment that is both prime and varies with the entry in a way that is sufficiently different from the index to cause entries with the same initial index to have different increments.

The difficulty with this approach, when building hardware, is the need for a multiply or divide and the use of prime numbers, which are not easily addressable. Patents such as U.S. Pat. No. 6,804,768, granted Oct. 12, 2004 to Moyer, and U.S. Pat. No. 6,785,278, granted Aug. 31, 2004 to Calvignau, et al., describe ways to create indexes without doing multiplies or divides, but not the increment function.

The best solution would be to traverse a space that is N binary address bits, or $2^N$ elements in size, ideally in a non-incremental fashion, and to do so without addition or multiplication. The problem then is to find a technique that is certain of traversing the entire size $2^N$ space without stepping through successive addresses.

SUMMARY OF THE INVENTION

This disclosure describes a method for accessing all data within a contiguous linear array before repeating by generating each subsequent address using a function of the current address and the data at the current address within the array, where the array is a power of 2 in size, and the function is a single bit shift and low-order bit insertion.

More specifically, some portion of the data within the array is generated by sorting a backward-rotated list of the least-order bits of a list of numbers that cover the address space of the array, where the list is generated by beginning with the number zero and successively choosing between double the number, modulo the size of the array, and double the number plus one as the next number, where double the number is chosen if double the number plus one is already in the list.

The disclosure also describes a method for generating a ordered list of all numbers between −1 and some power of 2, by beginning with the number zero and successively choosing between double the number and double the number plus one as the next number, wherein double the said number is chosen if double the said number plus one is already in the list; and the least-order bit of said ordered list is used to define connections in a serial shift register decoder. This forms the mathematical basis of the above-described hashing technique.

The serial shift register decoder is comprised of a single address input; a multiplicity of word line outputs; and a multiplicity of shift register stages, where each of the shift register stages is connected to a previous and a next shift register stage such that the data shifts through the shift register stages in a circular fashion, the input of half of the shift register stages is the AND of the said address input and the previous shift register stage, and the input of the other half of the shift register stages is the AND of the inverse of the address input and the previous shift register stage, and one of the word line outputs is driven by each shift register stage.

In one mode, after serially applying all address bits to the serial decoder at one bit per clock cycle, one of the shift register stages of the serial decoder drives its word line to the opposite state of all the other word lines; and in another mode, after each clock cycle, the shift register stage that drives that one word line transfers its data to the next shift register stage.

BRIEF DESCRIPTION OF THE DRAWINGS

The invention will now be described in connection with the attached drawings, in which:

FIG. 14 is another diagram of hash table hardware, which utilizes a multi-bit increment code.

DESCRIPTION OF VARIOUS EMBODIMENTS

Decoding is basically translating an address of N bits into 0s on 2N−1 lines and a logic level 1 on the specific line corresponding to the value of the N bits.

Figure 2:
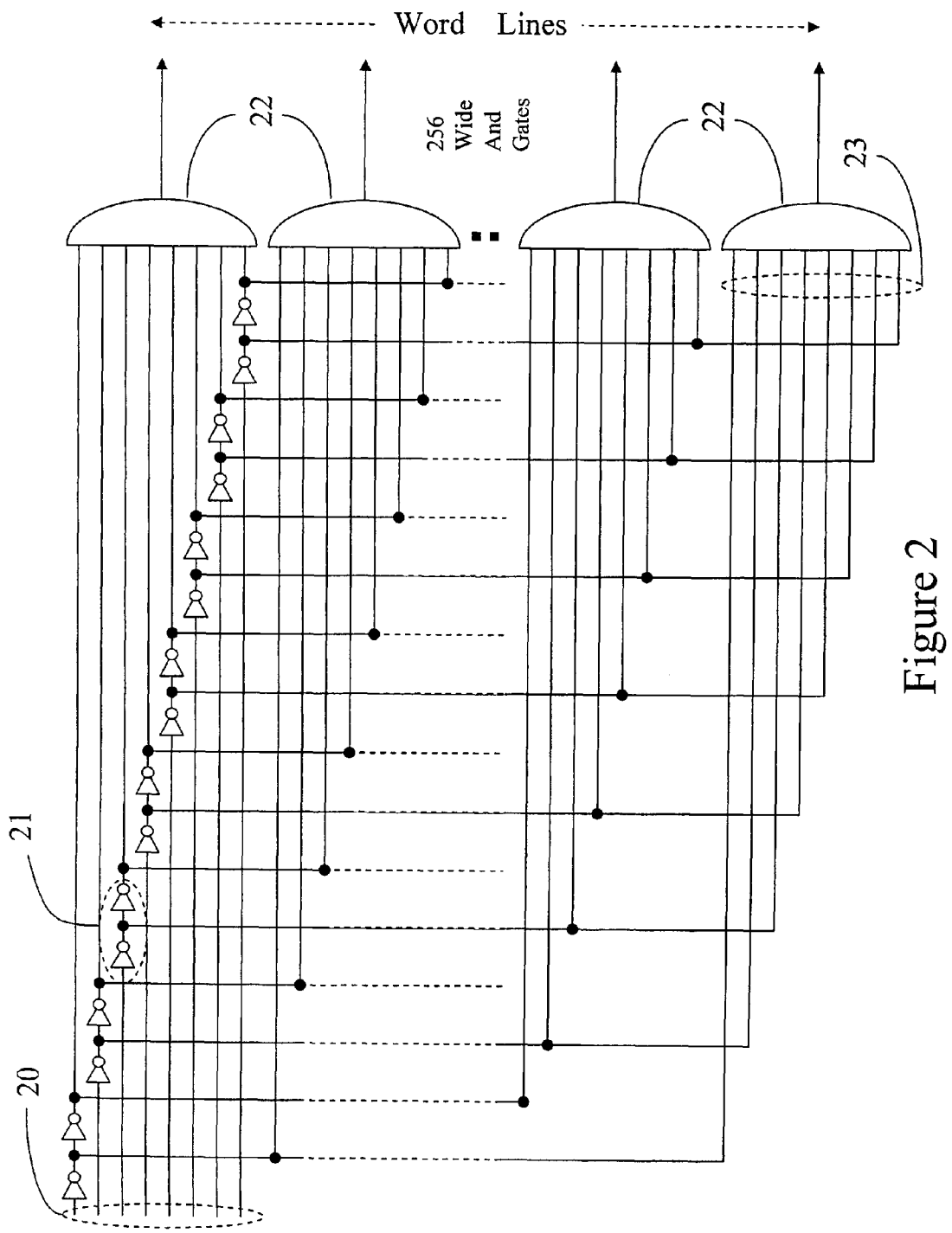
FIG. 2 is a diagram of a decoder.

Reference is now made to FIG. 2. Traditionally, both polarities of the N input values 20 are generated by a pair of inverters 21 and drive $2^N$ N-input AND gates 22, such that each AND gate is driven by a unique combination of one of the polarities of each of the original N values. For example, if the inputs 20 are $A_0, A_1, \ldots A_N$, then $-A_0, -A_1 \ldots -A_N$ 23 are generated from the inputs and are all on an N-input AND gate, which may be used to select for address 0. Using 2-input NAND or NOR gates, this structure would take $\sim N*2^N$ gates.

A preferred embodiment of the present invention is a serial shift register-based decoder that takes fewer gates than the equivalent traditional decoder structure when decoding more than 4-bit addresses.

Figure 3:
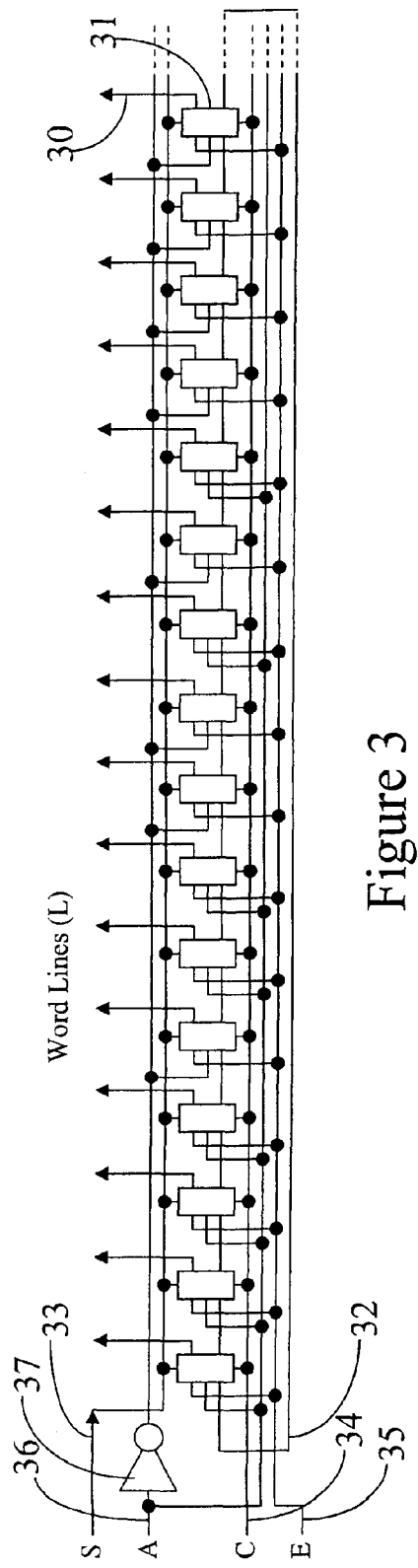
FIG. 3 is a diagram of an embodiment of a serial decoder.

Reference is now made to FIG. 3. The shift register has 2 storage elements 31, and the data out from the last element 32 drives into the first element in a circular fashion. Each of the $2^N$ word lines 30 is driven by a stage 31 of the shift register. A −S line 33, Clock line 34, and Enable line 35 drive into all stages of the shift register. An Address line 36 drives half of the stages in the shift register, and an inverter 37, which is driven by the Address line 36, drives the other half.

Figure 4:
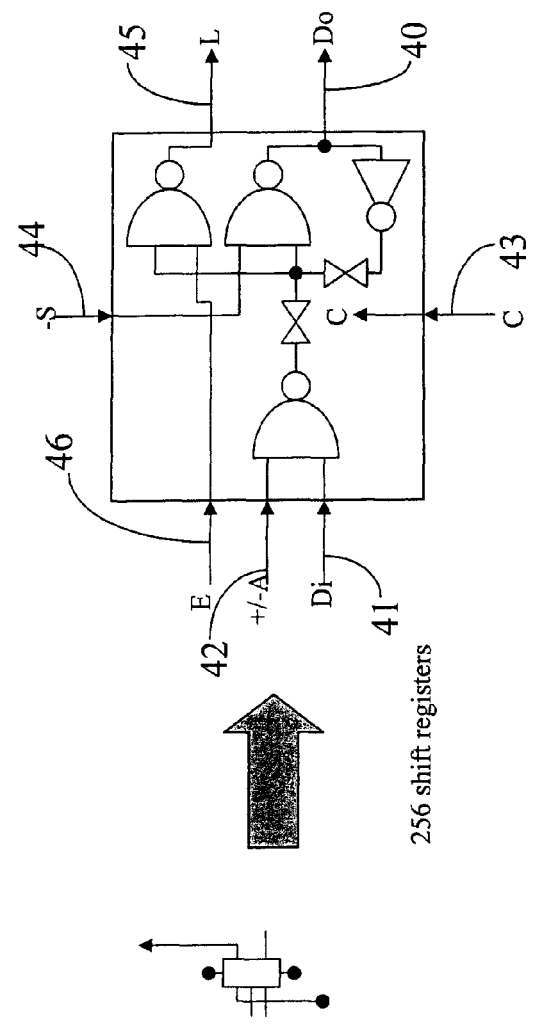
FIG. 4 is a diagram of one embodiment of the logic in each stage of the serial decoder.

Reference is now made to FIG. 4, which shows the detailed logic of one embodiment of a single stage of the shift register decoder. The value in each stage of the shift register is driven out the Do line 40, which is connected to the Di line 41 of the next stage of the register. Prior to loading the first address bit, all storage elements are set when the −S line 44, goes low. Subsequently, loading each address bit corresponds with clocking the shift register one location. The previous stage's value on the Di line 41 is gated with the current address bit 42 (A) or its inverse (−A), and is captured in the current stage when the clock 43 is high. The word lines 45 are enabled when an enable signal 46 goes high after the last address bit is loaded. This embodiment of a stage of the shift register decoder takes 4.5 gates, so in this case a decoder would take $4.5*2^N+1$ gates. In other words, for N>4, this technique takes less logic than the traditional decoder.

Furthermore, a traditional N-bit decoder built out of 2-input NAND gates has a delay path from its address register that includes driving $2^{N-1}$ loads, and an Inverter that drives $2^{N-1}$ loads, where each load further drives $\text{Log}_2(N)$ levels of NAND gates. By contrast, the serial decoder's address input drives $2^{N-1}$ loads and an Inverter, which drives $2^{N-1}$ loads, where each load further drives a single 2-input NAND gate, before capturing the result in the shift register, and only drives one 2-input NAND gate after clocking the shift register. In other words, the delay through a traditional decoder, after capturing all its address bits, is always greater than the delay through the serial decoder presented, after it has captured its last address bit.

The key to a properly functioning shift register-based serial decoder is the sign of the Address bit inputted into each stage of the shift register. Each successive address bit must be entered using the same structure, while the resulting decoded address shifts one location around the circular shift register; but in a traditional decoder, each address bit stays in a constant location and drives different AND gates with different polarities, so a simple upper half-lower half decode for each bit doesn't work on a shift register-based serial decoder.

What is needed is a way to distribute all possible combinations of $+/-A_X$ (i.e., the address bits and their inverses) such that each location has a unique combination of one or the other polarity of each of the $A_0$ to $A_N$ bits, where each term is a successive shifted serial combination of each address bit.

It is mathematically known that a set of all permutations of $+/-A_x$ for any number of $A_x$ bits has $2^N$ entries for N $A_x$ bits, and many orderings of such a set are possible, but a specific ordering must be found to have the characteristics of a decoder. One way to find such an ordering is to create a simulation, and to select the polarity of each stage so that after N shifts, all permutations of $+/-A_x$ exist in the shift register. Table 1 below contains three small examples of such a simulation. The +/− column indicates the polarity of the address bit ANDed at each stage of the shift register. The bits a,b,c and d correspond to the serial address bits $A_0,A_1,A_2,$ and $A_3$ and the upper case corresponds to the negative polarity (i.e., inverse).

TABLE 1

| | | bits: | | | | bits: | | | | | bits: | | |
|---|---|---|---|---|---|---|---|---|---|---|---|---|---|
| | | a | b | | | a | b | c | | | a | b | c | d |
| 1 | + | a | Ab | 1 | + | a | Ab | ABc | 1 | + | a | Ab | ABc | ABCd |
| 2 | + | a | ab | 2 | + | a | ab | Abc | 2 | + | a | ab | Abc | Abcd |
| 3 | − | A | aB | 3 | + | a | ab | abc | 3 | + | a | ab | abc | Abcd |
| 4 | − | A | AB | 4 | − | A | aB | abC | 4 | + | a | ab | abc | abcd |
| | | | | 5 | + | a | Ab | aBc | 5 | − | A | aB | abC | abcD |
| | | | | 6 | − | A | aB | AbC | 6 | + | a | Ab | aBc | abCd |
| | | | | 7 | − | A | AB | aBC | 7 | + | a | ab | Abc | aBcd |
| | | | | 8 | − | A | AB | ABC | 8 | − | A | aB | abC | AbcD |
| | | | | | | | | | 9 | − | A | AB | aBC | abCD |
| | | | | | | | | | 10 | + | a | Ab | ABc | aBCd |
| | | | | | | | | | 11 | − | A | aB | AbC | AbcD |
| | | | | | | | | | 12 | + | a | Ab | aBc | AbCd |
| | | | | | | | | | 13 | − | A | aB | AbC | aBcD |
| | | | | | | | | | 14 | − | A | AB | aBC | AbCD |
| | | | | | | | | | 15 | − | A | AB | ABC | aBCD |
| | | | | | | | | | 16 | − | A | AB | ABC | ABCD |

Each column to the right of the gray column is a shift stage, where the bit loaded on that cycle is at the top of the column. In these three examples, the polarities were selected such that the N-bit address is translated into $2^N$ possible word lines, where after N shifts all combinations of both polarities of each address bit exist, but not in normal numerical order. Also notice that the simulation is circular, as is the logic in FIG. 2, because the first location contains the negative polarity variables for all but the last inputted address bit, which it got from shifting the last bit in the shift register back to the first bit.

Still, in order for the decode technique to be useful, it is necessary to generate such a structure for $2^N$ shift elements, where N is larger than 4, but in order to create such a generator it is necessary to better define the problem.

This type of decoder generates an ordered list of the $2^N$ numbers, but it does so by successively combining the bits into stages of a circular shift register. If we transform the symbolic simulations in Table 1 into numbers, assuming 1s were shifted in, each entry in the last column of each simulation would correspond to a binary representation of a number from 0 to $2^N-1$. Table 2 shows the results of such a conversion from Table 1.

TABLE 2

| | | bits: | | | | bits: | | | | | bits: | | | |
|---|---|---|---|---|---|---|---|---|---|---|---|---|---|---|
| | | 1 | 1 | | | 1 | 1 | 1 | | | 1 | 1 | 1 | 1 |
| 1 | + | 1 | 01 | 1 | + | 1 | 01 | 001 | 1 | + | 1 | 01 | 001 | 0001 |
| 2 | + | 1 | 11 | 2 | + | 1 | 11 | 011 | 2 | + | 1 | 11 | 011 | 0011 |
| 3 | − | 0 | 10 | 3 | + | 1 | 1 | 111 | 3 | + | 1 | 11 | 111 | 0111 |
| 4 | − | 0 | 00 | 4 | − | 0 | 10 | 110 | 4 | + | 1 | 11 | 111 | 1111 |
| | | | | 5 | + | 1 | 01 | 101 | 5 | − | 0 | 10 | 110 | 1110 |
| | | | | 6 | − | 0 | 10 | 010 | 6 | + | 1 | 01 | 101 | 1101 |
| | | | | 7 | − | 0 | 00 | 100 | 7 | + | 1 | 11 | 011 | 1011 |
| | | | | 8 | − | 0 | 00 | 000 | 8 | − | 0 | 10 | 110 | 0110 |
| | | | | | | | | | 9 | − | 0 | 00 | 100 | 1100 |
| | | | | | | | | | 10 | + | 1 | 01 | 001 | 1001 |
| | | | | | | | | | 11 | − | 0 | 10 | 010 | 0010 |
| | | | | | | | | | 12 | + | 1 | 01 | 101 | 0101 |
| | | | | | | | | | 13 | − | 0 | 10 | 010 | 1010 |
| | | | | | | | | | 14 | − | 0 | 00 | 100 | 0100 |
| | | | | | | | | | 15 | − | 0 | 00 | 000 | 1000 |
| | | | | | | | | | 16 | − | 0 | 00 | 000 | 0000 |

Closer inspection of these results shows that each shift corresponds to doubling the previous stage's number and adding a 1 or 0 depending on the polarity of the stage of the shift register, and while there are duplications of numbers prior to N shifts, the results after N shifts are such that each number in each location is unique.

The key to generating such a list of polarities should be to create a $2^N$ list of numbers by setting zero as the first element in the list and successively doubling, modulo $2^N$, and adding one to the previous number in the list, checking to see if the new number already exists in the list, and decrementing it if it does. Table 3 shows the results of such a simulation for the three cases in Tables 1 and 2.

TABLE 3

| 2 bits | | 3 bits | | | 4 bits | | |
|---|---|---|---|---|---|---|---|
| 1 | x | 1 | 1 | x | 1 | 1 | x | 1 |
| 2 | x | 3 | 2 | x | 3 | 2 | x | 3 |
| 3 | | 2 | 3 | x | 7 | 3 | x | 7 |
| 4 | | 0 | 4 | | 6 | 4 | x | 15 |
| | | | 5 | x | 5 | 5 | | 14 |
| | | | 6 | | 2 | 6 | x | 13 |

TABLE 3-continued

| 2 bits | | 3 bits | | | 4 bits | | |
|---|---|---|---|---|---|---|---|
| | | | 7 | | 4 | 7 | x | 11 |
| | | | 8 | | 0 | 8 | | 6 |
| | | | | | | 9 | | 12 |
| | | | | | | 10 | x | 9 |
| | | | | | | 11 | | 2 |
| | | | | | | 12 | x | 5 |
| | | | | | | 13 | | 10 |
| | | | | | | 14 | | 4 |
| | | | | | | 15 | | 8 |
| | | | | | | 16 | | 0 |

The first column in each example contains the number of the shift stage. The second column contains an X where a 1 was added to the number in the previous stage, and the third column contains the number for that stage of the shift register. As can be seen in Table 3, all N-bit numbers are represented in the $2^N$ locations in each array, and though not in normal numerical order, correspond to the numbers in Table 2.

The code for a generation algorithm, which creates a list of $2^N$ elements corresponding to the $2^N$ stages of the shift register and generates a polarity array, where each element contains either a 1 for the positive polarity of $A_x$ or −1 for the negative polarity of $A_x$, from that list is as follows:

```
List(1)=1;
For I=2 to 2^N;
    Value=List(I-1)*2+1 Modulo 2^N;
    For J=1 to I-1;
        If Value = List(J) then
            Value = List(I-1)*2 Modulo 2^N;
            J=I
        end if;
    Next J;
    List(I) = Value
Next I;
For I=1 to 2^N;
    Polarity(I)=[List(I) Modulo 2 ]*2-1
Next I;
```

Figure 5:
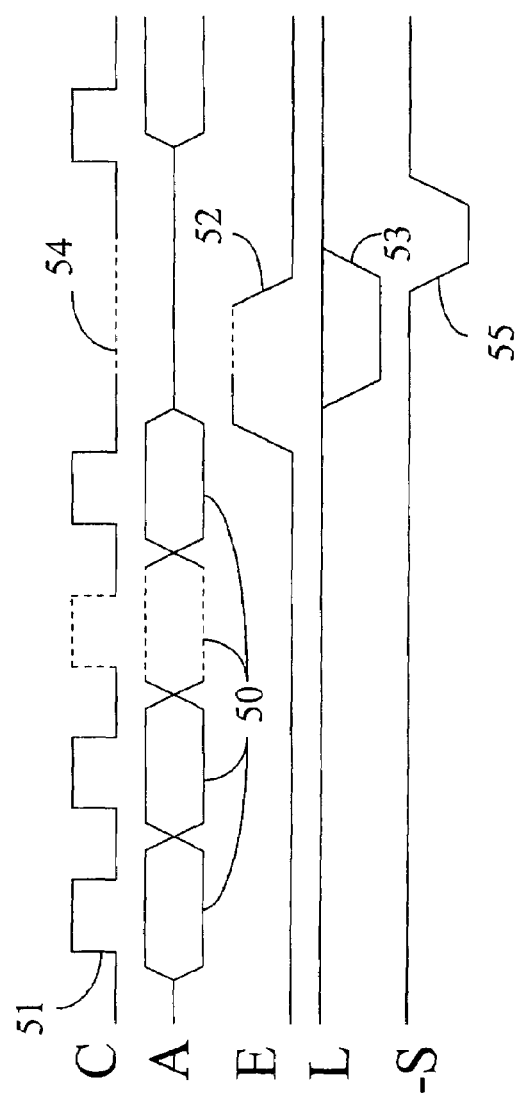
FIG. 5 is a timing diagram of one embodiment of the serial decoder.

Reference is now made to FIG. 5, a timing diagram of the decode structure shown in FIG. 3. The successive Address values (A) 50 are changed prior to the rising edge of the Clock (C) 51, which captures them into the shift register. After the last Address bit is loaded, the enable line (E) is brought high 52, which enables the Word lines (L) 53 to select the word being read or written, in which, when requiring more than one clock cycle, the clock is turned off 54 during the actual memory operation. Prior to loading the next address, the Set line (−S) must be pulled low 55 to reset the entire shift register.

Figure 6:
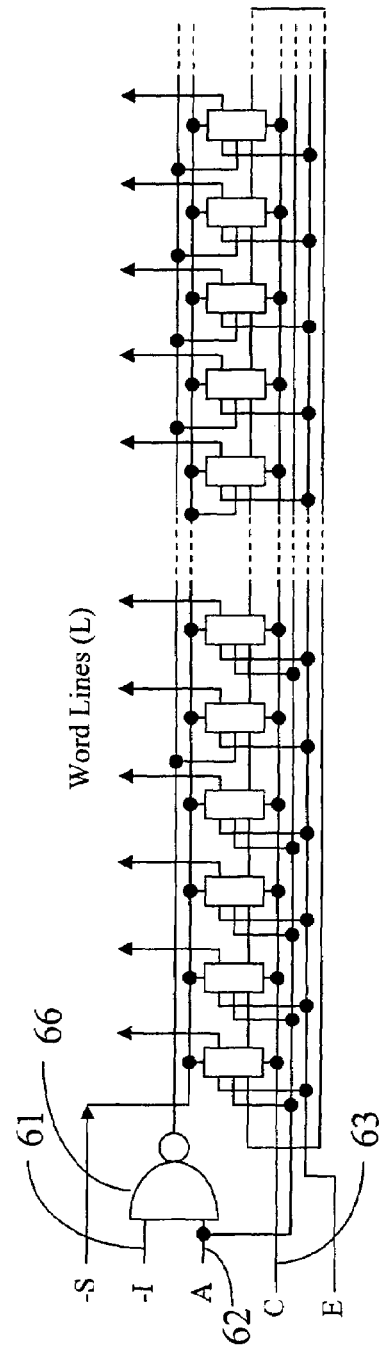
FIG. 6 is a diagram of another embodiment of the serial decoder.

Reference is now made to FIG. 6. After a specific address is loaded into the serial shift decoder, the resulting address may be shifted in a circular fashion throughout the entire decoder, by setting the Address data on all stages of the shift register high. This can be done by substituting the inverter 37 in FIG. 3 with a NAND gate 66 in FIG. 6. When the −I input 61 is set low and the Address input 62 is set high, both polarities of the Address input to each stage of the shift register are set high. Thus, after applying a positive pulse on the clock line 63, the single stage that is set high, which corresponds to the original selected address, is shifted to the next stage in the shift register.

Figure 7:
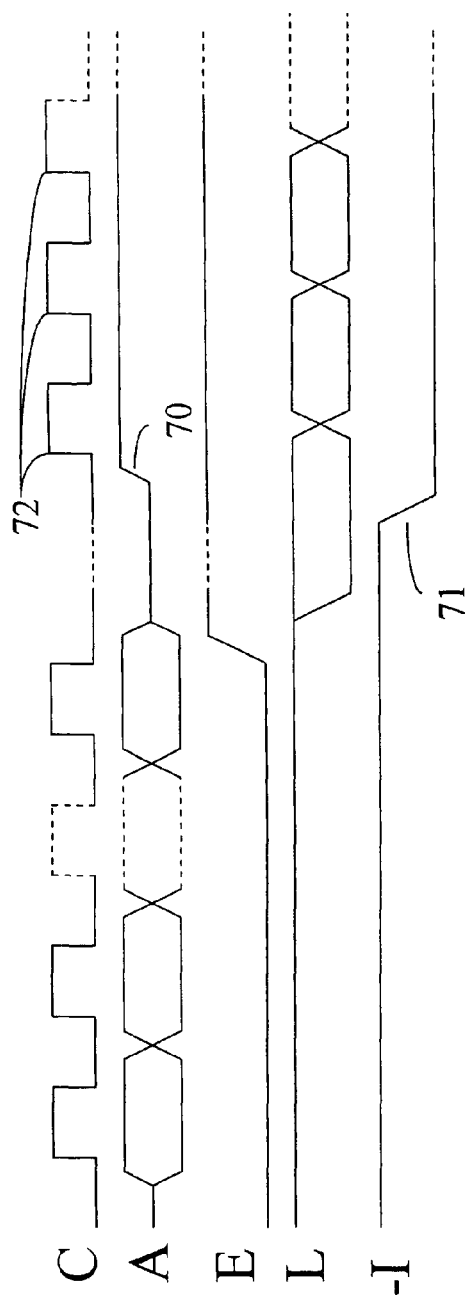
FIG. 7 is a timing diagram of another embodiment of the serial decoder.

Reference is now made to FIG. 7, which shows the timing diagram of the selection of a specific address followed by incrementally addressing a number of words in the memory. In this case, following the initial memory operation the Address input (A) and the increment control (−I) are set high 70 and low 71 respectively. Thereafter, each successive Clock (C) 72 causes the next address in the shift register to be selected. A simulation of the logic shown in FIG. 4 and extended in FIG. 6, is shown in Table 4 below.

of the decoder. While the clock is a regular signal with well-defined techniques for being distributed with very little skew, and the other control signals can also be tuned to reach all the stages of the shift register at their required times, the polarities of the address signal are distributed irregularly throughout the serial decoder, and may take more than one cycle to reach all the stages of the shift register.

Figure 8:
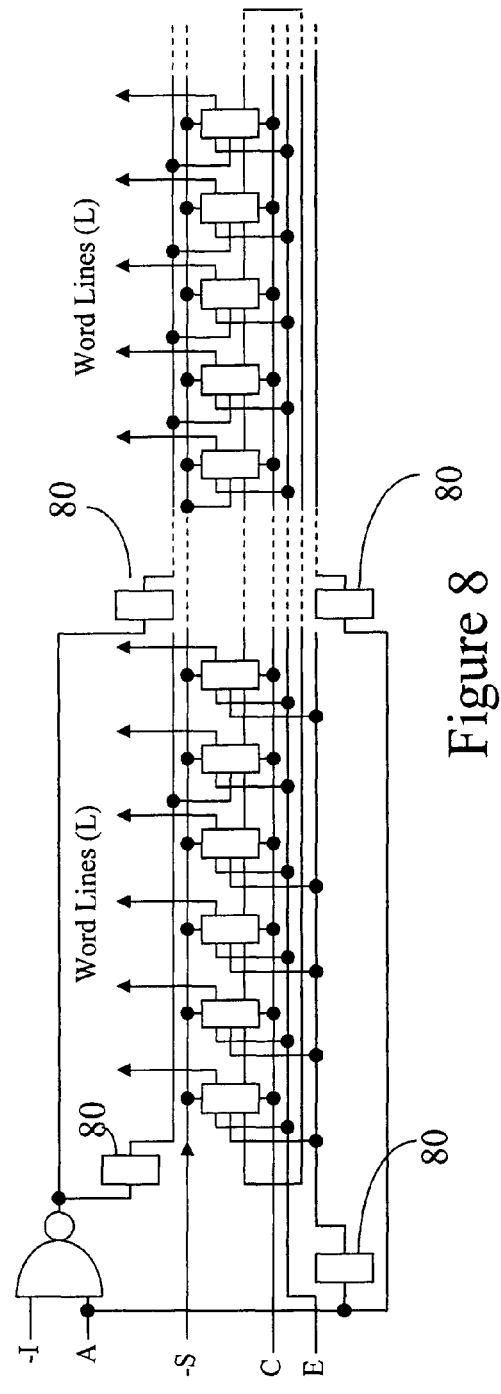
FIG. 8 is another embodiment of the serial decoder.
Figure 9:
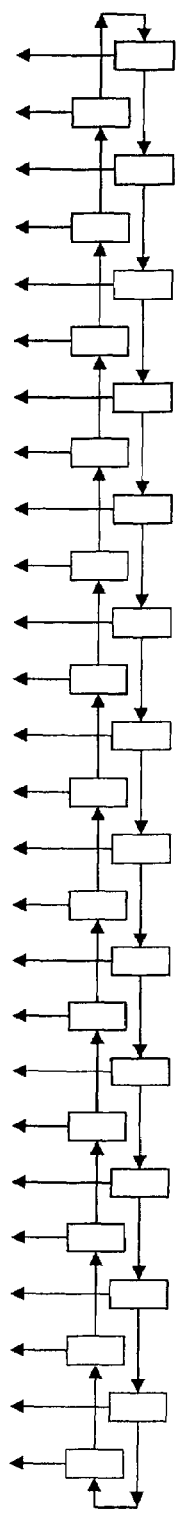
FIG. 9 is a diagram depicting one possible placement of the stages of a serial decoder.

Reference is now made to FIG. 8. To allow for the best possible performance, the Address line fan-out structure may be pipelined with the addition of 2K additional latches or flip-flops 80, which divides up the distribution of the Address signal into K sections, sufficiently small enough portions of the decoder to be processed in a single cycle. As a result an N-bit address will take N+1 cycles to decode, but at a shift speed that is comparable to the serial input data speeds from a SERDES.

Reference is again made to FIG. 1. Still this high performance memory has two address registers 13,14 for the upper- and lower-order address bits, and while a faster way to decode the upper bits has been shown, if the lower bits are loaded last and the delay path from the lower-order bit register 14 goes through the multiplexers 15, not a decoder. By replacing the multiplexers with tristate buffers, a faster serial decode solution can be implemented.

Figure 11:
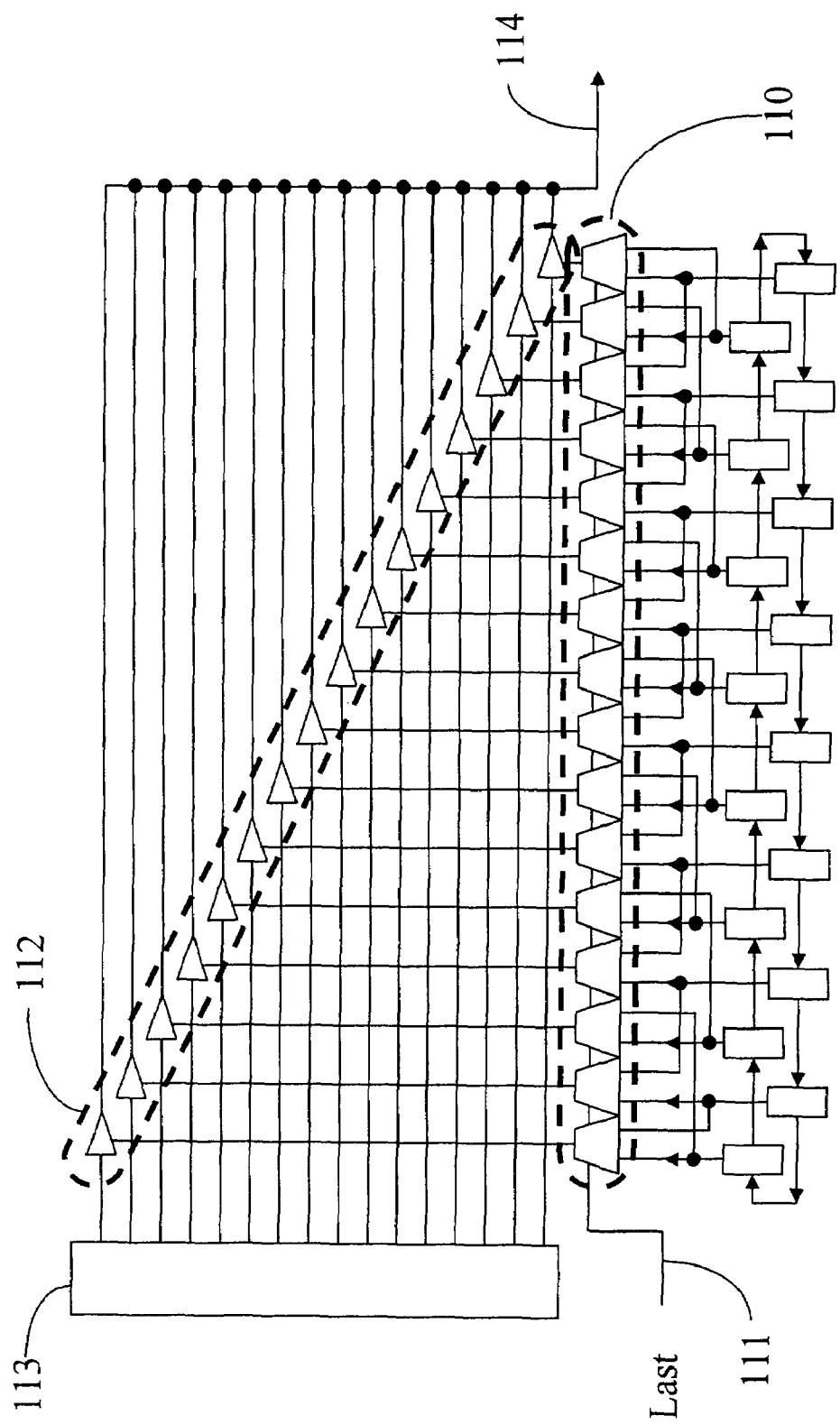
FIG. 11 is a diagram of a serial decoder used to select between memory data lines.

Reference is now made to FIG. 11. In this case, each of the word lines drives two multiplexers 110, which are controlled by a Last signal 111 that selects the prior word line on the penultimate cycle and the current word line on the last cycle of address loading. The outputs of the multiplexers 110 control tristate buffers 112, which in turn select the data line value from the memory core 113 to be driven onto the output 114. This serial decoder should have its enable signal set high at the end of the next-to-last address loading, which will enable two addresses, the word line prior to the actual address and the word line prior to the address with the opposite value for the address' least order bit, which is loaded on the last cycle, as shown in the simulation results in Table 4 above. When the last address bit is loaded, only the word line that corresponds to the final address is enabled. As such, with Last set low on the next-to-last cycle, two tristate buffers are enabled, one of which is still enabled on the last cycle, when the Last signal is set high. As a result, the data on the output 114 is either at mid voltage (of the tristate buffer) or the correct level one cycle ahead of loading the final address bit.

Figure 1:
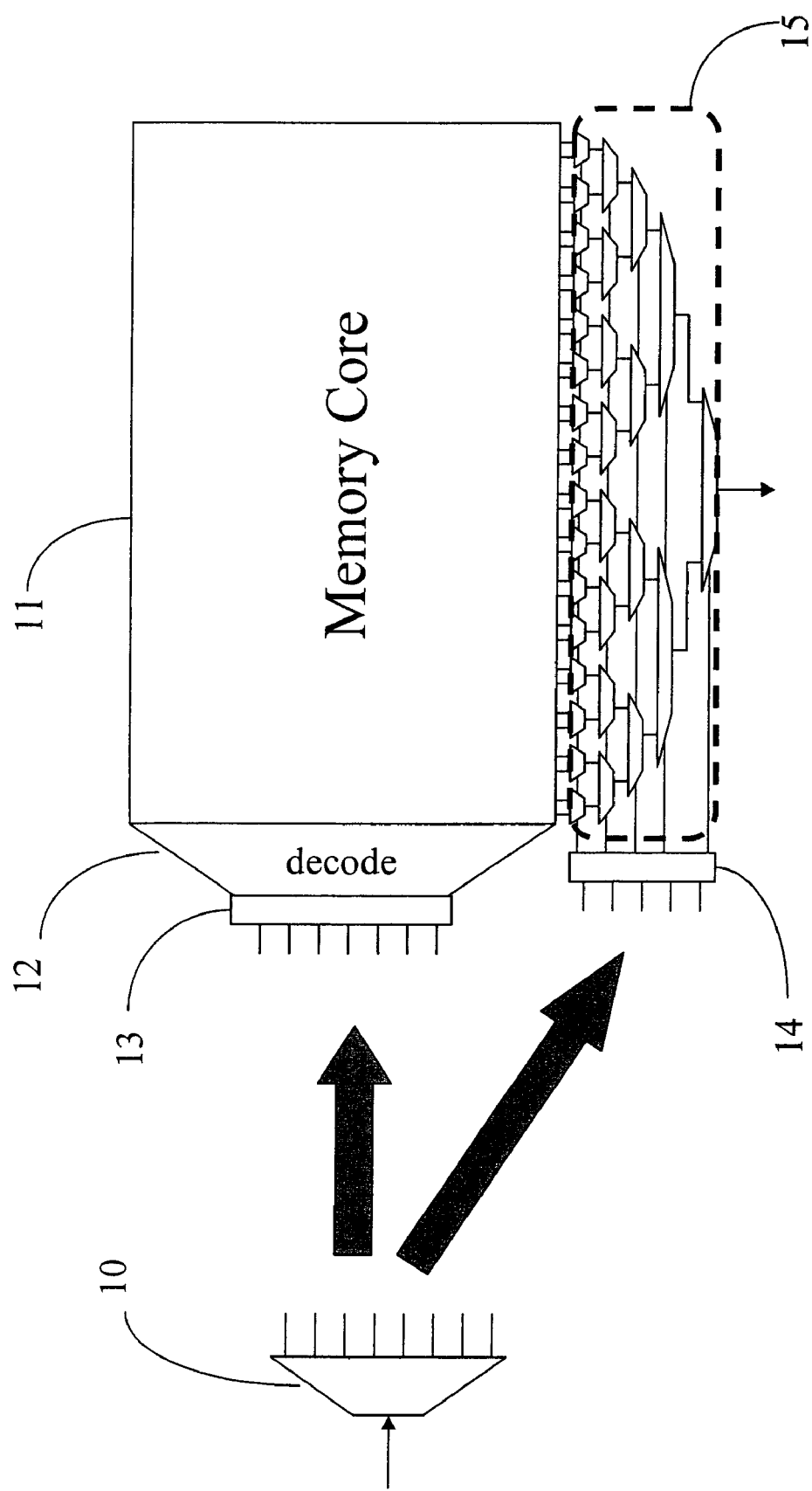
FIG. 1 is an abstract diagram containing a SERDES which drives a memory.

Now the delay of the traditional bit select and serial decode can be compared. The worst case delay path for the low-order address bits of the memory in FIG. 1 is $2^N$ loads on the first

TABLE 4

| | | | | Real Address: | | | | | | | | | | | | | | | |
|---|---|---|---|---|---|---|---|---|---|---|---|---|---|---|---|---|---|---|---|
| | | | | 1 | 3 | 7 | 15 | 14 | 13 | 11 | 6 | 12 | 9 | 2 | 5 | 10 | 4 | 8 | 0 |
| C# | −I | A | −S | 0 | 1 | 2 | 3 | 4 | 5 | 6 | 7 | 8 | 9 | 10 | 11 | 12 | 13 | 14 | 15 | Comments |
| 0 | 1 | 0 | 0 | 1 | 1 | 1 | 1 | 1 | 1 | 1 | 1 | 1 | 1 | 1 | 1 | 1 | 1 | 1 | 1 | Initialize |
| 1 | 1 | 1 | 1 | 1 | 1 | 1 | 1 | 0 | 1 | 1 | 0 | 0 | 1 | 0 | 1 | 0 | 0 | 0 | 0 | Decode |
| 2 | 1 | 1 | 1 | 0 | 1 | 1 | 1 | 0 | 0 | 1 | 0 | 0 | 0 | 0 | 0 | 0 | 0 | 0 | 0 | Addr = 14 |
| 3 | 1 | 1 | 1 | 0 | 0 | 1 | 1 | 0 | 0 | 0 | 0 | 0 | 0 | 0 | 0 | 0 | 0 | 0 | 0 | |
| 4 | 1 | 0 | 1 | 0 | 0 | 0 | 0 | 1 | 0 | 0 | 0 | 0 | 0 | 0 | 0 | 0 | 0 | 0 | 0 | |
| 5 | 1 | 1 | 1 | 0 | 0 | 0 | 0 | 0 | 1 | 0 | 0 | 0 | 0 | 0 | 0 | 0 | 0 | 0 | 0 | Shift |
| 6 | 0 | 1 | 1 | 0 | 0 | 0 | 0 | 0 | 0 | 1 | 0 | 0 | 0 | 0 | 0 | 0 | 0 | 0 | 0 | 14->13-> |
| 7 | 0 | 1 | 1 | 0 | 0 | 0 | 0 | 0 | 0 | 0 | 1 | 0 | 0 | 0 | 0 | 0 | 0 | 0 | 0 | 11->6 |
| 8 | 1 | 1 | 0 | 1 | 1 | 1 | 1 | 1 | 1 | 1 | 1 | 1 | 1 | 1 | 1 | 1 | 1 | 1 | 1 | Initialize |
| 9 | 1 | 0 | 1 | 0 | 0 | 0 | 0 | 1 | 0 | 0 | 1 | 1 | 0 | 1 | 0 | 1 | 1 | 1 | 1 | Decode |
| 10 | 1 | 1 | 1 | 1 | 0 | 0 | 0 | 0 | 1 | 0 | 0 | 0 | 1 | 0 | 1 | 0 | 0 | 0 | 0 | Addr = 5 |
| 11 | 1 | 0 | 1 | 0 | 0 | 0 | 0 | 0 | 0 | 0 | 0 | 0 | 0 | 1 | 0 | 1 | 0 | 0 | 0 | |
| 12 | 1 | 1 | 1 | 0 | 0 | 0 | 0 | 0 | 0 | 0 | 0 | 0 | 0 | 0 | 1 | 0 | 0 | 0 | 0 | |

The columns labeled 0 through 15, show the logical state of each of the 16 shift stages. The clock is implicitly one cycle per row, as labeled by the number of clocks (C#). The Enable line, not present in the simulation, merely transfers the logical state of the 16 shift stages onto the Word lines, which would normally occur on cycles 4, 5, 6, 7 and 12 of a simulation like the one shown in Table 4.

Note that as each bit of the 4-bit addresses is entered, the number of shift stages that are still set to a one level is reduced to half of the number on the previous cycle. Eight stages are set to one on cycles 1 and 9, four are set on cycles 2 and 10, two are set on cycles 3 and 11, with the remaining address set on cycles 4 and 12. Also note that on each cycle, the remaining stages set to a one level are rotated to the right one stage.

This serial decoder is designed for high-speed operation. The shift stages naturally want to be adjacent to each other, and by interleaving them in a fashion shown in FIG. 8, there is very little wire and only one gate delay between each stage register output driving Log₂(N) levels of multiplexers to the data output. By contrast, the serial shift decoder's address is latched into the shift register after decoding, so the delay path from the latch is merely a 2-input NAND gate that drives a multiplexer, which turns off the tristate buffer that is not addressed, because in the prior cycle the two possible tristates, one of which becomes the correctly addressed tristate were both turned on. Not only is the serial decode's delay clearly shorter, in the best case, when both bits selected on the prior cycle are at the same value, there is no delay because the data was already there.

Figure 10:
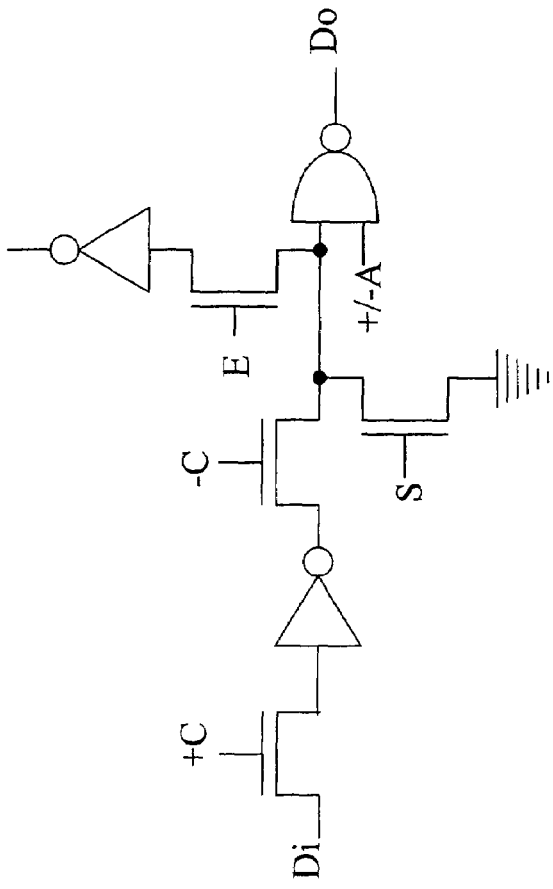
FIG. 10 is another embodiment of a stage of a serial decoder.

Reference is again made to FIG. 4, which shows one implementation of a stage of the serial decoder that requires a short clock pulse, because it is a single latch. A static flip-flop version of this logic would require at least 2 additional gates, but other smaller implementations are possible, such as a dynamic flip-flop as shown in FIG. 10, which only takes 3 gates. In other words, for low gate count implementations, serial decoders can require fewer gates than traditional decoders for anything above an 8:1 decode.

In yet another embodiment, the serial decoder, when implemented on a memory with its shift address option as shown in FIGS. 6 and 7, can serve as a hashing table.

In yet another embodiment of the current invention, the technique used to define the polarity of the address bits in the serial decoder may be used in conjunction with a normal memory to create a fast hardware or software hashing algorithm.

In general, the best hashing algorithm would be to traverse a space that is N binary address bits, or $2^N$ elements, in size, ideally in a non-incremental fashion, and to do so without additions or multiplications. The problem is to find a technique that is certain of traversing the entire size $2^N$ space without incrementing by 1 through all the addresses, and ideally without using an add or multiply operation.

The basis behind the serial decoder is a double and increment, which can be accomplished by a shift operation and least-order bit insertion. The examples in Table 3 above show full non-incremental traversals of the entire $2^N$ address space without using a multiply or add to generate the successive numbers. So by taking the 16-bit section of Table 3, as shown in columns A, B and C in Table 5 below, rotating the Xs to one location prior to their current locations in column B, as shown in column D, changing the Xs to 1s and blanks to 0s, and placing them in the locations specified by the originally generated numbers shown in column C, one obtains a list of 1s and 0s as shown in column F, for inserting into the least-order bit to generate the next hash address after shifting the current address. For example, the first four rows of column B are marked with Xs. These are moved to the last row and the first three rows of column D. Now using the corresponding values in column C, as addresses, 1s are placed in locations 0, 1, 3 and 7 in column F, where column E shows the addresses of the table in column F. Similarly, the other four Xs from the top to the bottom of column D cause 1s to be placed in locations 14, 13, 12 and 2 in column F, with all other rows of column F being set to 0s. In this manner, the columns D through G in Table 5 show the transformation, necessary to generate a hash table with the last column, G, showing the computed next address by shifting the current address in column E and inserting the 0 or 1 increment from column F.

TABLE 5

| 16 bits | | | Hash | | Next | |
|---|---|---|---|---|---|---|
| A | B | C | D | E | F | G |
| 1 | x | 1 | x | 0 | 1 | 1 |
| 2 | x | 3 | x | 1 | 1 | 3 |
| 3 | x | 7 | x | 2 | 1 | 5 |
| 4 | x | 15 |   | 3 | 1 | 7 |
| 5 |   | 14 | x | 4 | 0 | 8 |
| 6 | x | 13 | x | 5 | 0 | 10 |
| 7 | x | 11 |   | 6 | 0 | 12 |
| 8 |   | 6 |   | 7 | 1 | 15 |
| 9 |   | 12 | x | 8 | 0 | 0 |
| 10 | x | 9 |   | 9 | 0 | 2 |
| 11 |   | 2 | x | 10 | 0 | 4 |
| 12 | x | 5 |   | 11 | 0 | 6 |
| 13 |   | 10 |   | 12 | 1 | 9 |
| 14 |   | 4 |   | 13 | 1 | 11 |
| 15 |   | 8 |   | 14 | 1 | 13 |
| 16 |   | 0 | x | 15 | 0 | 14 |

It should be noted here that by successively going to the location specified in the right-most next column, all 16 locations in the table are accessed before repeating. Now, using the following procedure, the list of numbers can be generated:

```
Next Address(0)=0;
For I=1 to 2^N-1;
    Next Address(I) = Next Address(I-1)*2+1 modulo 2^N;
    For J=1 to I-1;
        If Next Address(I)=Next Address(J) then
            Next Address(I)=Next Address(I)-1
            J=I
        end if;
    Next J;
Next I;
```

This algorithm searches through the list of numbers already generated for one plus double the last number. If the number already exists, then double the number is used. It generates a non-repeating ordered list of numbers from 0 to $2^N-1$. The proof is not derived here, but the results of this algorithm can be easily checked by modifying it to fail when any of the even numbers are not unique.

Now the list of numbers can be used to create a set of increments that can be used in the following hashing algorithm:

```
Do until item = Table(Index) or Table(Index) = null
    Index = Inc(Index)+Index*2
Loop
```

To create the Increment table, merely do the following:

```
Do for I=0 to 2^N-1;
    Inc(Next Address(I)) = Next Address(I+1 modulo 2^N) modulo 2;
Next I
```

The Increment table could, for example, be one bit in the hash table.

Figure 12:
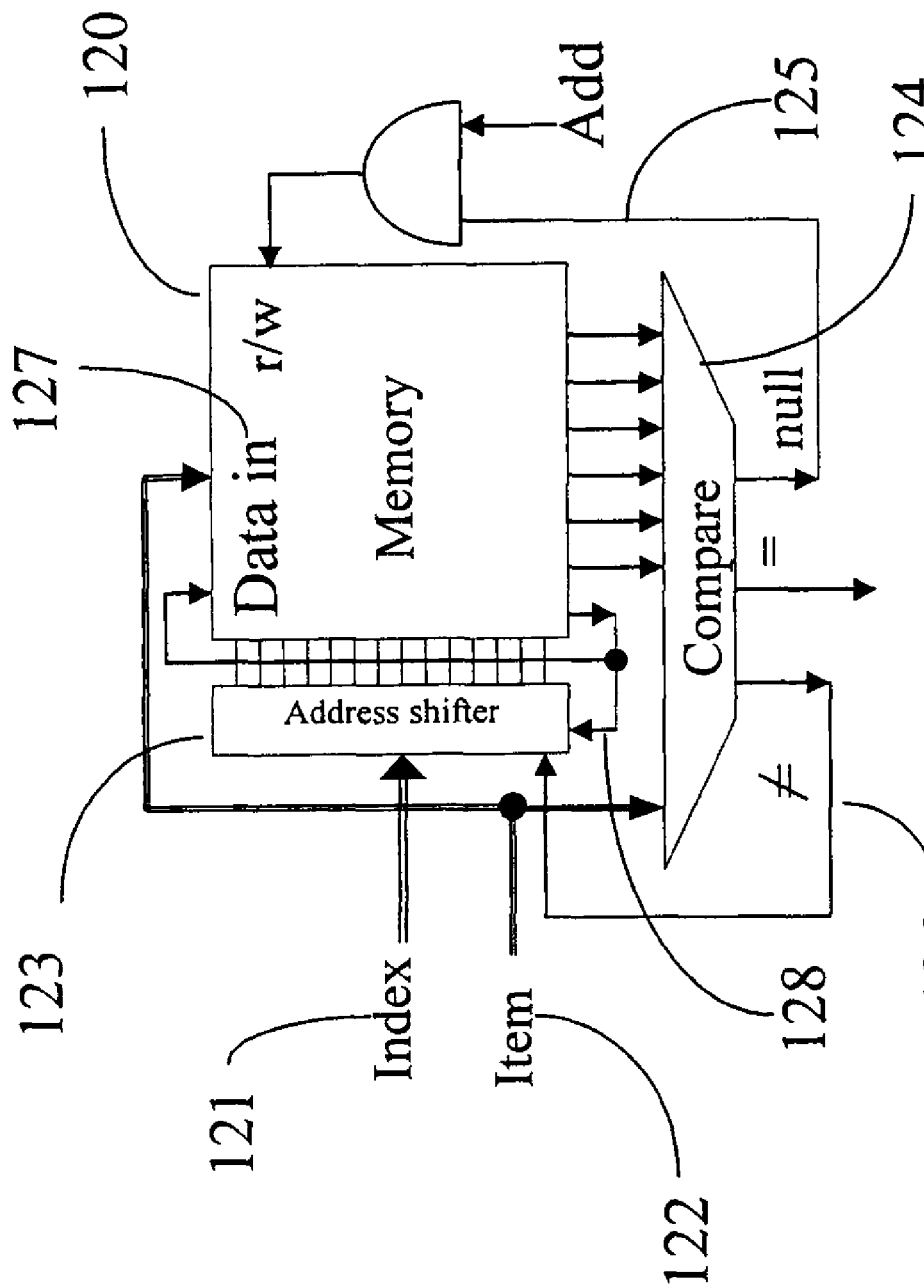
FIG. 12 is a diagram of one embodiment of hash table hardware.

Reference is now made to FIG. 12. The Increment array is loaded into the left-most bit of the Memory 120. An index 121, which is between 0 and $2^N-1$, the address space of the memory, is generated from the original item 122 and loaded into the Address shifter 123. In this example, Compare 124 compares the item 122 with the lower-order bits from the Index location in the Memory 120. If the compare is not equal 126, then the Index is shifted, and the Increment value 128 is inserted in the lowest-order bit of the Address shifter 123. This process continues until either a null is detected or the compare is equal. If a null occurs, the memory may be updated, by using the null signal 125 to control the read/write of the memory and putting the item with the current Increment value on the Data In port 127 of the memory; otherwise, the current address is in the address shifter 123.

It should be noted here, that the serial decoder automatically does this operation when moving from decode to serial shift mode.

This technique may also be implemented in software, and as shown in FIG. 12, the Increment bits are placed in the highest-order bit of the memory words. Given a reasonable function to create the Index from the Item, such as the exclusive-or of the Item's high-order bits with its low-order bits, this hashing technique may be performed on a processor with simple Boolean functionality, since no multiplies or adds are needed. This is very useful in the case where a dedicated embedded processor may be used to perform the hashing function, because a much smaller processor would meet the computational requirements. Below is an example of abstract assembly code that could be used in such a processor. In this example, the $2^N$ Hashing Table is located on a $2^N$ memory address boundary to eliminate the need for adding the base address of the table to the index.

```
Next:    Load R1 From              /* R1 contains the Index
         Memory(Value)
         Load R2 with R1           /* R2 contains the Item
         Shift Right R1 N bits     /* R3 contains the Result
         XOR R1 with R2            /* R4 contains the Increment
Find:    AND R1 with 2^N-1         /* Memory(Item) is a fixed address
         OR R1 with Table          /* 2^N-1, and Sign bit are constants
         Address
         Load R3 From
         Memory(R1)
         Load R4 with R3
         AND R4 with Sign bit      /* leave Increment bit only
         XOR R3 with R4            /* clear Increment bit from Result
         Compare R2 with R3
         Branch on equal
         to Found
         Compare R3 with Null
         Branch on equal to Insert
         OR R1 with R4             /* put Increment into Index
         Rotate Left R1 1 bit
         Branch to Find            /* Item was not found, continue
Insert:  Branch on -Add to Next    /* -Add is a predefined branch code
         OR R2 with R4             /* Item was not found add it to table
         Store R2 in Memory(R1)
         Branch to Next
Found:                             /* Item was found in the Table
```

Clearly, the assembly code example above presumes the Hash Table entries were initialized with the Null value concatenated with the Increment value. Since the Increment bit is the sign bit, this code assumes the Items and Results are always positive (including the Null value), because it clears the Increment bit from the Result before comparing Item to it. It also assumes that the Table Address is positive because it puts the Increment bit into the high-order bit of the Index before rotating. It is further understood that a person skilled in the art may further optimize the code for any specific processor, and may modify it to handle Table insertions and/or subsequent searches in a different manner than presented above. Still, the above example does illustrate the technique's ability to traverse the Hash Table in a non-incremental way, without the use of Add or Multiply instructions.

In yet another embodiment of the present invention, serial decoders may consist of multiple circular shift register strings. The techniques described above may apply to any number of bits shifted in parallel into the decoder.

Figure 13:
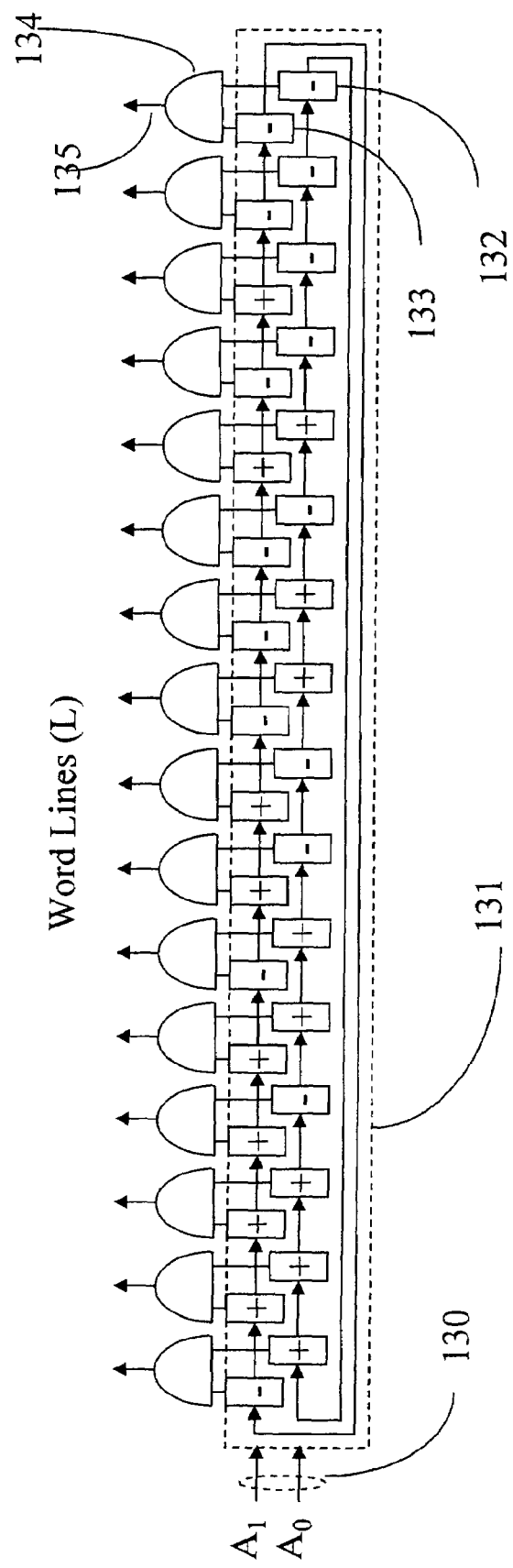
FIG. 13 is a diagram of a serial decoder with two parallel address inputs.

Reference is now made to FIG. 13. In this case, there are two address bits 130 loaded in parallel into two 16-bit circular shift registers, where each stage 132 is composed of the logic shown in FIG. 4. In FIG. 13, the outputs from any specific stage number, say 15, in both registers 132 and 133, drive the same AND gate 134, which in turn drives a word line 135. The polarity of each respective address bit is shown by the + or – in each of the stages. In this case 4 bits of address are loaded in 2 clock cycles, two bits per cycle. By generalizing the polarity generation for any M bits per cycle and any N cycles, the size of the decode is $2^{M*N}$ and the polarities for each shift register and stage can be generated as follows:

```
List(1)=1;
For I=2 to 2^(N*M);
    Inc = 2^M-1;
    Value=List(I-1)*2^M+Inc Modulo 2^(N*M);
    For J=1 to I-1;
        If Value = List(J) then
            Inc=Inc-1;
            Value = List(I-1)*2^M+Inc Modulo 2^(N*M);
            if Inc>0 then
                J=I;
            else
                J=1;
            end if;
        end if;
    Next J;
    List(I) = Value
Next I;
For I=1 to 2^(N*M);
    Value = List(I) Modulo 2^M
    Do J=1 to M;
        Polarity(I,J)=[Value Modulo 2 ]*2-1
        Value = integer of Value/2
    Next J;
Next I;
```

Like the ordered list of numbers shown in Table 3, the next value in the list is determined by shifting the current value and adding the increment, but in this case the number of bits shifted is greater than one (if M>1) and the increment could be as large as $2^M-1$, so the algorithm above tries to use the current value*$2^M$+the largest increment ($2^M-1$) first. If it finds that this value was already in the list, it then tries one less, and so on, until the current value*$2^M$ is selected as the next value. It should also be noted here that while all the examples in Tables 2, 3 and 5 show the ordered lists starting with 1, actually, a complete ordered list may be generated when starting with any number from 0 to $2^M-1$. As with the single bit case, the technique always covers all values from 0 to $2^{MN}-1$. Also, the array Polarity contains 1 for the positive of the address bit and –1 for the negative of the address bit, for each of the $2^{N*M}$ bits, but in this case for all the circular shift registers. The first dimension of the Polarity array is the stage number, and the second is the shift register number. For the decoder in FIG. 13, N=2 and M=2, hence $2^{N*M}$=16. The value of Inc can be either 0, 1, 2 or 3, a two-bit quantity that is broken into an upper and lower bit ring, where the upper bit ring is driven by $A_1$ and the lower bit ring is driven by $A_0$. The ordered list of numbers, increments and polarities, generated for the decoder in FIG. 13 by the code above, can be seen in Table 6 below, along with a simulation of the decoder:

TABLE 6

| | | | | | | | Increment | | | | | | | | | |
|---|---|---|---|---|---|---|---|---|---|---|---|---|---|---|---|---|
| | 1 | 3 | 3 | 2 | 3 | 1 | 2 | 2 | 1 | 1 | 0 | 3 | 0 | 2 | 0 | 0 |
| Polarity 1: | − | + | + | + | + | − | + | + | − | − | − | + | − | + | − | − |
| Polarity 0: | + | + | + | − | + | + | − | − | + | + | − | + | − | − | − | − |
| Real Addr: | 1 | 7 | 15 | 14 | 11 | 13 | 6 | 10 | 9 | 5 | 4 | 3 | 12 | 2 | 8 | 0 |
| C#  Addr | 0 | 1 | 2 | 3 | 4 | 5 | 6 | 7 | 8 | 9 | 10 | 11 | 12 | 13 | 14 | 15 |
| 0  A1  x | 1 | 1 | 1 | 1 | 1 | 1 | 1 | 1 | 1 | 1 | 1 | 1 | 1 | 1 | 1 | 1 |
| 0  A0  x | 1 | 1 | 1 | 1 | 1 | 1 | 1 | 1 | 1 | 1 | 1 | 1 | 1 | 1 | 1 | 1 |
| 0   L out: | 1 | 1 | 1 | 1 | 1 | 1 | 1 | 1 | 1 | 1 | 1 | 1 | 1 | 1 | 1 | 1 |
| 1  A1  1 | 0 | 1 | 1 | 1 | 1 | 0 | 1 | 1 | 0 | 0 | 0 | 1 | 0 | 1 | 0 | 0 |
| 1  A0  0 | 0 | 0 | 0 | 1 | 0 | 0 | 1 | 1 | 0 | 0 | 1 | 0 | 1 | 1 | 1 | 1 |
| 1   L out: | 0 | 0 | 0 | 1 | 0 | 0 | 1 | 1 | 0 | 0 | 0 | 0 | 0 | 1 | 0 | 0 |
| 2  A1  0 | 0 | 0 | 0 | 0 | 0 | 1 | 0 | 0 | 1 | 0 | 0 | 0 | 1 | 0 | 1 | |
| 2  A0  1 | 1 | 0 | 0 | 0 | 1 | 0 | 0 | 0 | 1 | 0 | 0 | 1 | 0 | 0 | 0 | 0 |
| 2   L out: | 0 | 0 | 0 | 0 | 0 | 0 | 0 | 0 | 1 | 0 | 0 | 0 | 0 | 0 | 0 | 0 |

The first row of Table 6 shows the Inc values for the 16 word lines. This translates into the polarity lists 0 and 1 applied to the rings in the example, the next two rows in the table. The fourth row in the table is the real decoded address, with the numerical order of the stages shown in the fifth row. Like the simulation shown in Table 4, the rings begin an address decode by being set to all 1s, but in this case the 4 to 16 decode shows the 4-bit address being inputted in two consecutive cycles of two bits each, where A1 on the first cycle is the highest order bit of the address, and A0 on the second cycle is the lowest order bit of the address. This example shows a decode of the number 9, which is located in stage 8.

Clearly, this approach takes almost twice the gates of a single-bit decode, but can decode two bits at a time, and the whole address in half as many cycles as a single-bit serial decoder. Furthermore this technique may be generalized as described above to generate a decode comprised of any M circular shift registers each with $2^{M*N}$ stages, which can decode an M*N bit address in N clock cycles at M bits per clock cycle. For example, three 64-stage circular shift registers may be generated, which decodes a 6-bit address in two clock cycles (M=3, N=2, and $2^{M*N}$=64).

In yet another embodiment of the present invention, the hashing increment may also be more than one bit. A two-bit increment for a hash code increment can be generated from the Inc values in Table 6 in a similar fashion to generating the single-bit increment values. By rotating the values in the left direction one slot and sorting the resulting numbers by the real decode values, the following Table 7 is generated:

TABLE 7

| | | | | | | | Inc | | | | | | | | | |
|---|---|---|---|---|---|---|---|---|---|---|---|---|---|---|---|---|
| | 1 | 3 | 3 | 2 | 3 | 1 | 2 | 2 | 1 | 1 | 0 | 3 | 0 | 2 | 0 | 0 |
| Addresses | 1 | 7 | 15 | 14 | 11 | 13 | 6 | 10 | 9 | 5 | 4 | 3 | 12 | 2 | 8 | 0 |
| Rotated | 3 | 3 | 2 | 3 | 1 | 2 | 2 | 1 | 1 | 0 | 3 | 0 | 2 | 0 | 0 | 1 |
| | | | | | | | Sorted | | | | | | | | | |
| Addresses | 0 | 1 | 2 | 3 | 4 | 5 | 6 | 7 | 8 | 9 | 10 | 11 | 12 | 13 | 14 | 15 |
| Increments | 1 | 3 | 0 | 0 | 3 | 0 | 2 | 3 | 0 | 1 | 1 | 1 | 2 | 2 | 3 | 2 |

The Inc array shown in the first row of Table 6 is reproduced as the top row of Table 7, along with the real addresses from the fourth row of Table 6 in the second row of Table 7. When the Inc array values are shifted left one, as shown in the third row of Table 7, and both the real addresses and the increments are sorted by the real addresses, and the resulting increment order can be found in the bottom row of the table.

Reference is now made to FIG. 14. The resulting two-bit increment values in the bottom row of Table 7 can be loaded into the Memory 144, such that when the next address is needed, the current address 142 that was loaded in the decoder 143 is shifted two bits, and the two increment values 141 are inserted into the two lower-order bits. In this way the entire memory can be traversed in the same manner as with the single-bit case. Of course, similar changes to the software hashing are also contemplated to adapt the software hashing technique shown above to handle more than one bit of increment data.

It is also contemplated that the generated polarity lists may also be used in reverse order, or in any other order that meets the requirements to create serial decoders and hashing structures such as described above.

It is further contemplated that other serial functions may be generated comprising one or more features of the above serial decoder, or hashing table, such as serial comparators, serial selectors, serially addressed switches, serially addressable polling structures, or other similar structures.

It will be appreciated by persons skilled in the art that the present invention is not limited by what has been particularly shown and described hereinabove. Rather the scope of the present invention includes both combinations and sub-combinations of various features described hereinabove as well as modifications and variations which would occur to persons skilled in the art upon reading the foregoing description and which are not in the prior art.

I claim:

1. A serial decoder comprising:
an address input;
a plurality of word line outputs; and
a plurality of shift register stages;
wherein respective ones of the shift register stages are connected to a previous and a next one of the shift register stages so that data shifts through said shift register stages in a circular fashion;
wherein, at half of the plurality of the shift register stages, the contents of the previous shift register stage for respective ones of the shift register stages of the half of the plurality of shift register stages are configured to be gated using the address input;
wherein, at the other half of the plurality of the shift register stages, the contents of the previous shift register stage for respective ones of the shift register stages of the other half of the plurality of the shift register stages are configured to be gated using the inverse of said address input; and
wherein a respective word line output is configured to be driven by a respective shift register stage.

2. The serial decoder of claim 1, wherein respective ones of the shift register stages comprise at least one NAND gate configured to gate the contents of the previous shift register stage with either the address input or the inverse of the address input.

3. The serial decoder of claim 1, further comprising a set input configured to set one or more of the shift register stages.

4. The serial decoder of claim 1, further comprising an enable input configured to enable an output to at least one of the word line outputs.

5. The serial decoder of claim 1, further comprising a circular shift input configured to gate the inverse of the address input and to permit a specific address to be circular shifted through the serial decoder.

6. The serial decoder of claim 5, further comprising a NAND gate configured to receive the circular shift input and the address input.

7. A hashing table comprising the serial decoder of claim 5.

8. The serial decoder of claim 1, further comprising two or more storage elements configured to distribute the address input and the inverse of the address input to different subsets of the plurality of shift register stages.

9. The serial decoder of claim 1, further comprising:
a plurality of multiplexers, wherein a respective one of the plurality of multiplexers is coupled to receive as inputs two of the word line outputs; and
a select input configured to select a first of the inputs to a respective one of the plurality of multiplexers on a first cycle and a second of the inputs to the respective one of the plurality of multiplexers on a second cycle.

10. The serial decoder of claim 9, wherein the first cycle corresponds to a next-to-last cycle of address loading, and wherein the second cycle corresponds to a last cycle of address loading.

11. The serial decoder of claim 9, further comprising a plurality of tri-state buffers, wherein a respective one of the tri-state buffers is configured to receive, as a control input, an output of one of the multiplexers and is further configured to gate a data value to a common output line coupled to the tri-state buffers.

12. The serial decoder of claim 1, wherein the shift register stages are configured in an interleaving fashion.

13. A serial decoder comprising:
an address input;
a plurality of word line outputs; and
a plurality of shift register stages;
wherein respective ones of the shift register stages are connected to a previous and a next one of the shift register stages so that data shifts through said shift register stages in a circular fashion;
wherein, at half of the plurality of the shift register stages, the contents of the previous shift register stage for respective ones of the shift register stages of the half of the plurality of shift register stages are configured to be gated using the address input;
wherein, at the other half of the plurality of the shift register stages, the contents of the previous shift register stage for respective ones of the shift register stages of the other half of the plurality of the shift register stages are configured to be gated using the inverse of said address input; and
wherein a respective word line output is configured to be driven by a respective one of the shift register stages; and further including first and second modes, wherein:
in the first mode, the decoder is configured to start with all word line outputs enabled and on each clock cycle to successively choose half of the enabled word line outputs based on the polarity of the address input, until one of the shift register stages drives one of the word line outputs to a state opposite to the state of all the other word line outputs; and
in the second mode, after each clock cycle, the one of the shift register stages that drives one of the word line outputs to an opposite state shifts to a next one of the shift register stages.

14. A serial decoder comprising:
an address input;
a plurality of word line outputs; and
a plurality of circular shift register strings, respective ones of the circular shift register strings comprising a plurality of shift register stages;
wherein respective ones of the shift register stages in respective ones of the circular shift register strings are connected to a previous and a next one of the shift register stages so that data shifts in a circular fashion through the respective shift register stages of the respective circular shift register strings;
wherein, at half of the plurality of the shift register stages in the respective circular shift register strings, the contents of the previous shift register stage for respective ones of the shift register stages of the half of the plurality of shift register stages in the respective circular shift register strings are configured to be gated using the address input;
wherein, at the other half of the plurality of the shift register stages in respective ones of the circular shift register strings, the contents of the previous shift register stage for respective shift register stages of the other half of the plurality of the shift register stages in respective ones of the circular shift register strings are configured to be gated using the inverse of said address input; and
wherein respective word line outputs are configured to be driven by logical combinations of outputs of shift register stages from respective ones of the circular shift register strings.

15. The serial decoder of claim 14, wherein the address input comprises multiple bits, wherein at least one of the multiple bits is configured to be used as a register address input to a corresponding one of the circular shift register strings, and wherein the register address input or its inverse is configured to be used in gating the contents of a previous shift register stage being provided to a next shift register stage of a corresponding one of the circular shift register strings.

16. The serial decoder of claim 15, wherein a respective one of the word line outputs is coupled to an output of a shift register stage of a respective one of the circular shift register strings.

17. The serial decoder of claim 14, wherein the logical combination is a logical AND.

* * * * *